United States Patent [19]

Hollenberg et al.

[11] Patent Number: 4,823,458
[45] Date of Patent: Apr. 25, 1989

[54] FOAM BODIED HAIR CURLER

[75] Inventors: Detlef Hollenberg, Hilden; Hans Schneider, Schwalmtal; Georg Weihrauch, Kreidach, all of Fed. Rep. of Germany

[73] Assignee: Henkel Kommanditgesellschaft auf Aktien, Duesseldorf, Fed. Rep. of Germany

[21] Appl. No.: 877,697

[22] Filed: Jun. 20, 1986

Related U.S. Application Data

[63] Continuation of Ser. No. 654,833, Sep. 26, 1984, abandoned, which is a continuation-in-part of Ser. No. 573,074, Jan. 23, 1989, abandoned.

[30] Foreign Application Priority Data

Dec. 21, 1983 [DE] Fed. Rep. of Germany ....... 3346164

[51] Int. Cl.⁴ .............................................. B29C 47/02
[52] U.S. Cl. .................................. 29/527.2; 29/527.4; 264/45.9
[58] Field of Search .................. 29/527.4, 527.2, 33 F; 264/45.9; 132/39; 81/9.41, 9.42, 9.43

[56] References Cited

U.S. PATENT DOCUMENTS

| | | | |
|---|---|---|---|
| 1,522,265 | 1/1925 | Peacock | 29/527.4 X |
| 2,542,601 | 2/1951 | Van Cleef | 132/43 |
| 2,693,809 | 11/1954 | Spencer | 132/43 |
| 2,757,676 | 8/1956 | Hamilton | 132/42 R |
| 2,838,054 | 6/1958 | Fischer | 132/43 |
| 2,928,130 | 3/1960 | Gray | 18/48 |
| 2,994,327 | 8/1961 | Otto et al. | 264/45.9 X |
| 3,410,932 | 11/1968 | Woodson et al. | 264/45.9 |
| 3,896,198 | 7/1975 | Utumi et al. | 264/45.9 |
| 3,981,649 | 9/1976 | Shimano et al. | 264/45.9 X |
| 4,181,647 | 1/1980 | Beach | 264/45.9 |
| 4,304,713 | 12/1981 | Perelman | 264/45.9 |
| 4,395,214 | 7/1983 | Phipps et al. | 425/214 |
| 4,426,065 | 1/1984 | Komatsuzaki | 264/45.9 |

FOREIGN PATENT DOCUMENTS

| | | |
|---|---|---|
| 663774 | 5/1963 | Canada . |
| 751183 | 1/1967 | Canada . |
| 780678 | 3/1968 | Canada . |
| 1031127 | 5/1978 | Canada . |
| 1043972 | 12/1978 | Canada . |
| 1109625 | 9/1981 | Canada . |
| 1124950 | 6/1982 | Canada . |
| 1144324 | 4/1983 | Canada . |
| 1148317 | 6/1983 | Canada . |
| 1154216 | 9/1983 | Canada . |
| 1154566 | 10/1983 | Canada . |
| 1177614 | 11/1984 | Canada . |
| 1181912 | 2/1985 | Canada . |
| 1677386 | 3/1954 | Fed. Rep. of Germany . |
| 1697640 | 10/1954 | Fed. Rep. of Germany . |
| 1767158 | 5/1958 | Fed. Rep. of Germany . |

Primary Examiner—Howard N. Goldberg
Assistant Examiner—Joseph M. Gorski
Attorney, Agent, or Firm—Ernest G. Szoke; Wayne C. Jaeschke; Henry E. Millson, Jr.

[57] ABSTRACT

This invention relates to a novel continuous process for producing a hair curler comprising an elongated foam-plastic body with a substantially axially extending wire insert which is shorter than the length of the elongated foam-plastic body.

22 Claims, 5 Drawing Sheets

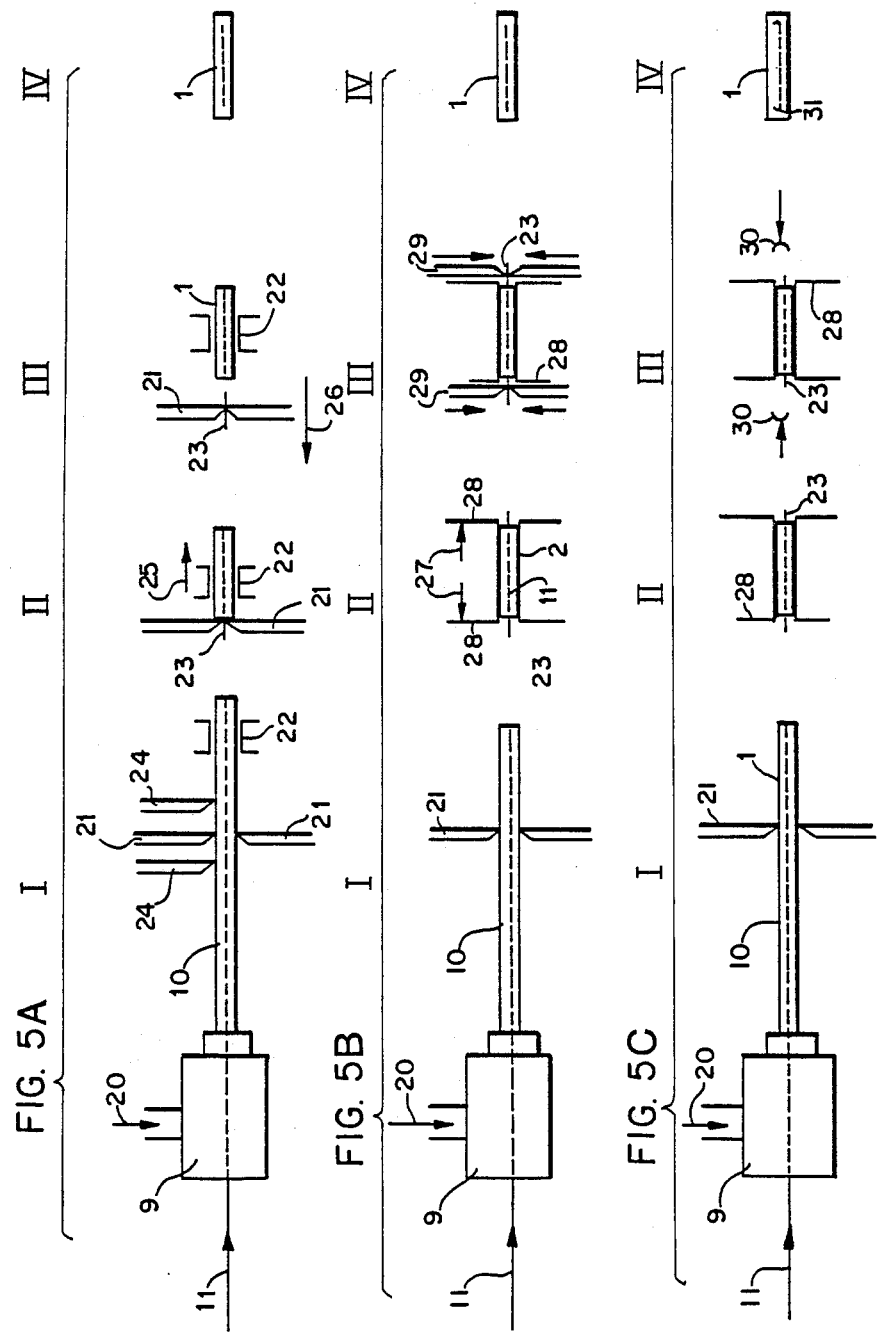

FOAM BODIED HAIR CURLER

This application is a continuation of application Ser. No. 654,833, filed Sept. 26, 1984, now abandoned which is a continuation-in-part of copending application Ser. No. 573,074, filed Jan. 23, 1984 and now abandoned.

FIELD OF THE INVENTION

This invention relates to a novel continuous process for producing a hair curler. More particularly, this invention relates to a process for producing a hair curler, also known as a "roller", consisting of an elongate foam-plastic body with a substantially axially extending wire insert which is shorter than the length of the elongated foam-plastic body.

BACKGROUND OF THE INVENTION

It is known from DE-GM No. 17 67 158 that curlers of foam, or "rollers", can be formed with a longitudinal bore and that a stabilizing wire, which is also used to receive a clip for a curl of hair to be held on the curler, can be introduced into the bore. The wire may be flexible or elastic, uncoated or plastic-coated. Also, it may be freely moved back and forth in the bore and projects therefrom at both ends to such an extent that a clip for a curl of hair may be fastened thereto. The curlers according to DE-GM No. 17 67 158 are relatively stiff and cannot be compared in terms of function and cost with the roller-type hair curlers which are the subject of this invention.

In addition DE-GM No. 16 77 386 and DE-GM No. 16 97 640 disclose curlers having wire inserts which are shorter than the length of the curler. In DE-GM No. 16 77 386 a plastic foam is cast in the mold of the desired hair curler with a wire insert therein. In DE-GM No. 16 97 640 a locking curler of foam rubber is disclosed containing a metal insert. No method is described for the manufacture of the curler.

In the past, hair rollers have been produced by in-mold foaming. To this end, an extrusion-foamed granulate consisting, for example, of low-density polyethylene (LDPE) or of polyurethane (PUR) is produced and subsequently processed to form the molding. The extrusion die used for this purpose is for example, a breaker plate. The foamed strands are size-reduced immediately after issuance from the die to form the granulate. The granulate is introduced into the particular mold, optionally after radiation-induced cross-linking to gel contents of from about 20 to 40%, and heated until it melts at the surface by heating of the mold. By subsequent reduction of the volume of the mold, the hot granulates are consolidated to form a molding. If the roller-type curlers individually mold-foamed in this way are to be sufficiently stable, a length of wire has to be introduced, generally by hand, into their cores.

Roller-type curlers produced by in-mold foaming have an undesirably high specific gravity for practical application. Accordingly, hair curlers having unit weights below 100 kg/m³ have been produced by extrusion foaming. Unfortunately, curlers such as these do not have the necessary stability for practical application because the pieces of wire separately introduced during in-mold foaming to stabilize the curler could not be integrated into the production process in extrusion foaming when they have to be shorter than the foam body.

OBJECTS OF THE INVENTION

It is an object of the invention to provide a continuous process for the production of a roller-type hair curler consisting of an elongate foam-plastic body with a substantially axially extending wire insert which is shorter than the length of the elongated foam plastic body.

It is a further object of the invention to provide a continuous process for the production of a foam-plastic roller having a wire insert and an outer surface or skin sufficiently stiff for curling hair and providing protection from injury by the wire insert.

These and other objects of the invention will become more apparent in the discussion below.

BRIEF DESCRIPTION OF THE INVENTION

FIGS. 5A to 5C represent diagrams of process variants for shortening wires within individual foam-plastic bodies;

DETAILED DESCRIPTION OF THE INVENTION

Figure 1:
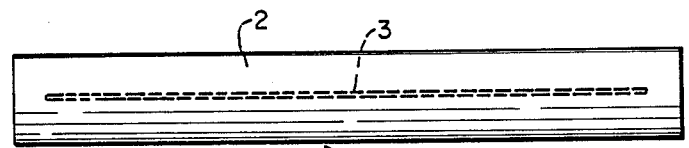
FIGS. 1 and 1A represent longitudinal and cross-sectional views, respectively, of a foam roller according to the invention.

According to the invention, a continuous process for producing a hair curler consisting of an elongate foam-plastic body with a substantially axially extending wire insert is disclosed. The hair curler, or roller, is characterized in that the roller-type body consists of extrusion-foamed plastic and the wire insert is formed into the plastic as a stabilizing core, giving a foam-plastic hair curler which, despite its very low specific gravity, has the stiffness in flexure required to perform its function.

The plastic used is preferably low-density polyethylene (LDPE) containing processing aids, the density of the foamed polyethylene having to be below about 100 kg/m³ and preferably of the order of about 50 kg/m³ or lower. In addition to LDPE, it is also possible to use plastics suitable for processing by direct gassing providing they have a deformation resistance high enough for producing the curler body, coupled with relatively high elasticity. For example, high-density polyethylene (HDPE) and flexible polyvinyl chloride (PVC) may be used.

In the continuous process for producing the roller-type hair curler, the foam plastic body is produced in the form of an endless shape with endlessly inserted wire from foam-plastic shapes produced by direct gassing, physical blowing agents being used. The endless profile of the foam plastic body with inserted wire then has to be cut into individual lengths and finished in such a manner that the wire insert is unable to protrude through the cut surface on either end of the cut individual lengths.

In a first particularly advantageous embodiment of the process for the production of the hair curler according to the invention, the wire inserts is shortened at both longitudinal ends, relative to the length of the plastic body, to such an extent that the wire terminates within the plastic body at a distance from its longitudinal end faces. The wire insert may consist of a deformable, non-resilient material, such as one or more individual wires and also of metal-filled plastic wires. In another, preferred embodiment of the production process, of the hair curler, the insert may not have to be shortened or bent double at its ends where plastic-coated wires are used, providing the ends of the plastic-coated wire do not in themselves involve any risk of injury.

In the particular case of a hair curler according to the invention consisting of low-density polyethylene (LDPE) foam, in which only the (preferably cylindrical) outer skin is sealed in the extrusion process and the disc-like ends are formed as cut surfaces with open pores, the ends where the wire has been cut can be prevented from penetrating through the cut surfaces by positioning the ends of the wire at a sufficient distance from the cut surfaces within the curler body. The shortening involved can be advantageously achieved by punching through the wire with a punch having a cutting surface approximately that of the diameter of the wire and removing the ends of the wire at a distance from the ends of the curler body (the places where the punch has passed through the plastic remain visible but are not unseemly); by pushing back the resilient foam material and shortening the wire and allowing the foam to spring back; by pushing back the resilient foam material, forming a loop or rounded head, and allowing the foam material to spring back, the ends of the wire by being bent double in the shape of a hair grip or by forming spherical heads on the ends of the wire, simultaneously anchoring the wire in the plastic body to avoid any longitudinal shifting.

There is no need for the ends of the wire to be bent double or formed into rounded heads providing the foam material projecting beyond the ends of the wire is heated and compressed. This is preferably done by means of teflon-coated heating elements because, in this way, the outer skin of the foam is compressed at the ends of the roller, preventing the wire from shifting longitudinally and also from breaking through. It is of particular advantage to use concave heating elements because the domes thus formed at the ends of the rollers cover the penetration zone of the wire when the rollers are in use.

Firm anchorage of the wire insert in the plastic body can be obtained not only by looping but also by greater compression of the material adjoining the wire core. Compression such as this is achieved by keeping the wire relatively cold when it is combined with the hot foam. In addition to or instead of this, the wire may be ribbed, corrugated or provided with other markings or may have been passed through an adhesive or adhesion promoter such as a hot-galvanized coating or a plastic coating before being brought into contact with the extrusion foam to avoid any risk of longitudinal shifting.

Corrugation or other marking of the wire may also be obtained after the wire has been covered with foam by means of suitable tools working on and through the foam without any danger of the foam being permanently deformed as a result.

The outer skin of the foam plastic body is also easy to regulate in terms of grip, thickness, and shape in the process according to the invention. If the forming tool is kept relatively hot compared to the hot foam mass, a relatively thin outer skin, for example, is obtained, whereas a very thick outer skin is obtained where a relatively cold tool is used. Grip or handhold may be adjusted by ribbing or corrugation with longitudinal and/or transverse marking of the extrusion dies and/or by gearwheel embossing immediately after emergence from the forming tool, i.e., before hardening is complete. Milling techniques may also be advantageously used for improving grip. For example, deeper ribbing may be obtained by milling the material lengthwise using milling units equipped with saw-blade-like milling cutters.

The invention can perhaps be better understood by making reference to the drawings. The foam roller 1 in FIGS. 1 and 1A consists of a plastic body 2 of highly foamed low-density polyethylene (LDPE) with a stabilizing core or wire insert 3. In the embodiment illustrated, the plastic body 2 has a length of about 13.5 cm and a diameter of about 1.0 cm. An average unit weight of 40 kg/m$^3$ was measured for the roller 1 without the wire insert 3. Accordingly, the foam weight of the roller 1 amounted to 0.39 gm per roller. The weight of the 12.5 cm long black wire insert 3, 0.1 cm in diameter, amounted to 0.82 gm per wire.

The dimensions mentioned about are merely exemplary. The hair roller according to the invention may in practice have a length of from about 6.0 to 18.0 cm, preferably from about 8.0 to 15.0 cm, and a diameter of from about 0.75 to 10.0 cm, preferably from about 1.0 to 8.0 cm. The wire insert, which may be formed from any suitable coated or uncoated metal, such as aluminum, or stainless steel, or chrome-plated steel, may have a diameter of from about 0.05 to 0.5 cm, preferably from about 0.1 to 0.3 cm, and a length of from about 5.0 to 17.0 cm, preferably from about 7.0 to 14.0 cm.

Figure 1A:
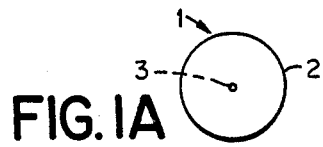
Figure 2:
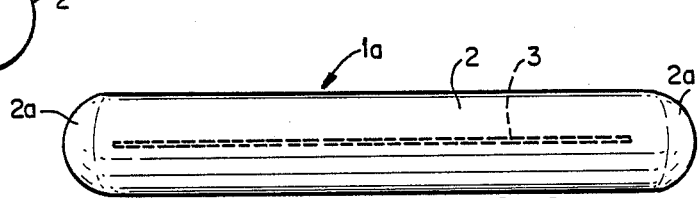
FIG. 2 represents a foam roller according to the invention, with compressed longitudinal ends.

The foam roller 1 shown in FIG. 2 differs from that shown in FIG. 1 above all in the longitudinal ends 2a which are preferably compressed into round domes. The compression zones are indicated by hatching.

Figure 3:
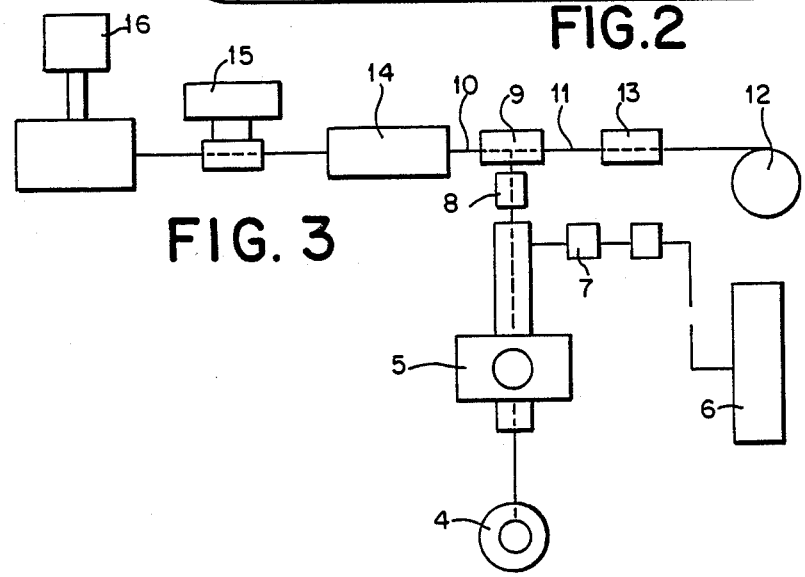
FIG. 3 represents a schematic of an extrusion plant producing endless strands of foam roller.

The extrusion plant shown in FIG. 3 consists of eleven linked units. The polyethylene granulate is introduced together with processing aids into the feeder 4 and delivered to an extruder 5. The melt formed in the extruder 5 is supplied with blowing gas from a gas tank or holder 6 via metering pumps 7. The melt thus prepared is cooled in the cooling zone 8 and delivered to a crosshead 9, where a wire 11 is embedded in the core of the strand 10 as the strand is being formed. The wire 11 passes from a drum 12 via an aligning unit 13 into the crosshead 9. The finished strand 10 passes through a cooling tank 14 and a take-off unit 15 to a winding reel 16.

Figure 4:
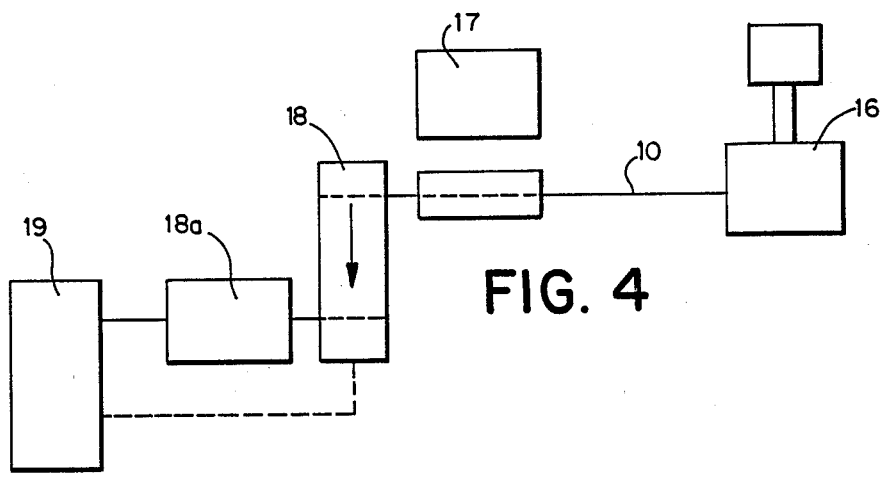
FIG. 4 represents a schematic of an installation for converting the endless strands to individual foam rollers.

To convert the endless roller form into individual rollers, as shown in FIG. 4, the strand 10 is run off from the reel 16 into a take-off and cutting unit 17 wherein the individual rollers 1 cut from the strand 10. The individual roller then pass into a unit 18 for shortening the wires at their ends and, optionally, into a unit 18a for compressing the longitudinal ends of the rollers projecting beyond the ends of the wire. Finally, the individual rollers are delivered to an automatic bundling and packaging machine 19.

FIGS. 5A to 5C represent three process variations, which may, if desired, replace the wire-shortening unit 18 and compressing unit 18A and, possibly, the take-off and cutting unit 17 of the installation shown in FIG. 4. In all three variations, foam 20 from the extruder and wire 11 pass into the crosshead 9 in which, as in FIG. 3, the foam plastic strand 10 with a wire core is formed.

In the variation shown in FIG. 5A, the strand 10 is first cut in a process stage I by means of a pair of blades 21, which smoothly cut the foam body itself but merely clamp the wire insert. At the same time, the roller 1 to be cut off is held fast by means of jaws 22. In this variation of the process, the wire ends 23 are displaced into the interior of the roller by means of two punch cutters 24 of approximately the same diameter as the wire, which cut the wire 11 through the plastic, after which—in process stages II and III—the roller 1 which has been cut off is taken off by means of the clamping jaws 22 in the direction of the arrow 25 and the piece of wire which has bewen punched out is withdrawn in the direction of the arrow 26 by means of the pair of blades 21. The finished roller 1 may be deposited in process state IV.

According to the drawing cut variation shown in Figure 5B, the individual roller 1 is completely cut off in stage I, after which in a following stage II the foam body 2 is compressed over the wire in the direction of the arrows 27 by means of special clamping tools 28 and the ends 23 of the wire are cut off by means of cutters 29 in a stage III. In a stage IV, the foam body is able to expand again, and the finished roller 1 is deposited.

With regard to another drawing cut process variation shown in FIG. 5C, stages I and II are the same as in FIG. 5B. In stage III, however, the wire ends 23 are not cut off but instead are bent double by means of special bending tools 30 so that, after expansion of the foam body in stage IV, the wire ends 23 bent over, particularly in the manner of a hair grip, enter the interior of the roller 1 to be deposited in the form of wire eyelets 31.

Figure 6A:
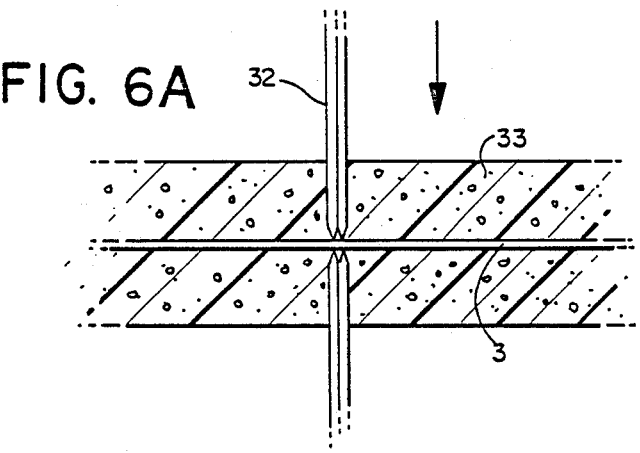
FIG. 6 represents a further development of the process illustrated in FIG. 5A.
Figure 6B:
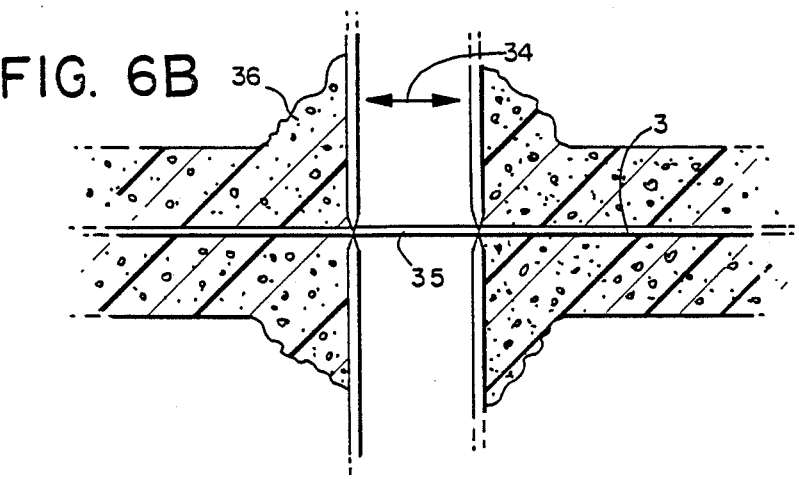
Figure 6C:
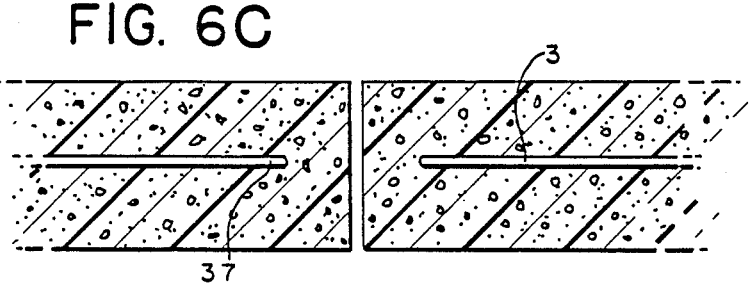
Figure 7A:
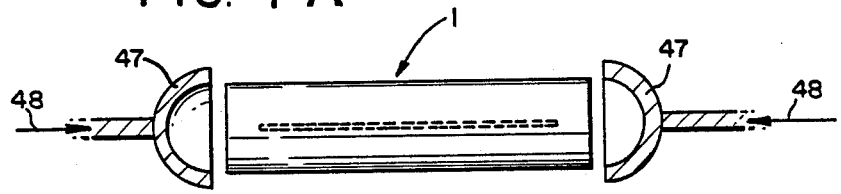
FIG. 7 represents a further development of the process illustrated in FIGS. 5 and 6.
Figure 7B:
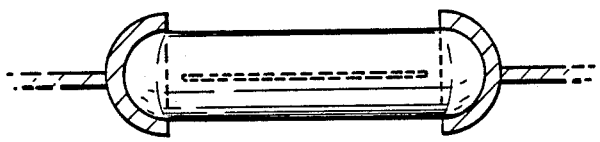
Figure 7C:
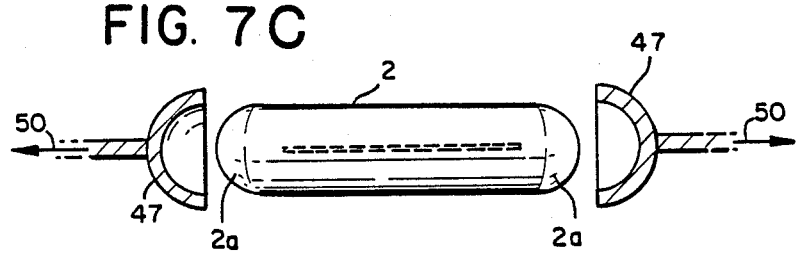

The process stages and machinery shown in FIGS. 5A to 5C may be further developed as shown in FIGS. 6 and 7 respectively.

In the embodiment shown in FIG. 6, the process steps to be added onto the extrusion of foamed rollers namely, the pushing back of the foam and the cutting out and removal of a piece of wire, are combined. As shown in the drawing, a double blade 32 cuts through the foam 33 in stage a, displaces or pushes it in stage b onto the wire core 3 by movement of the two blades apart from one another in the direction of the arrows 34, and immediately afterwards cuts out a piece of wire 35. After the double blade 32 has been withdrawn, the displaced foam 36 expands in stage c and covers the shortened wire ends 37.

FIG. 7 shows a process which may be added with advantage onto the processes shown in FIGS. 5A to C and 6, in each case onto the phase where the roller is complete in regard to incorporation of the wire ends in the foam. In successive phases I, II and III, it is shown how, for example by means of concave heating elements 47 which are moved in the direction of the arrow 48 towards the longitudinal ends 49 of the prepared roller 1 and are heated in phase II, the longitudinal ends 49 can be given a form corresponding to the molds or heating elements 47 with compressed regions 2a opposite the wire ends. After the heating elements 47 have been separated in the direction of the arrow 50 from the plastic body 2 in phase III of Figure 7, a finished roller of the type shown in FIG. 2 is obtained.

Figure 8:
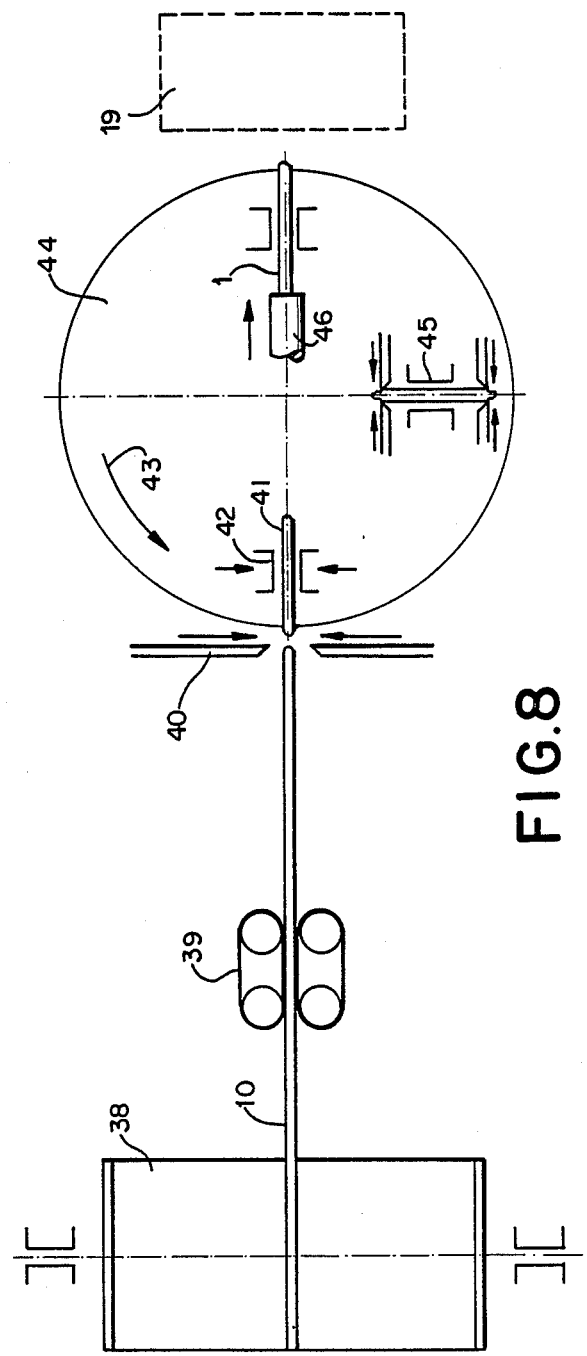
FIG. 8 represents further development of the process illustrated in FIG. 5B.

A further development of the process shown in Figure 5B is illustrated in FIG. 8. The strand 10 coming from a reel 38 passes through a take-off unit 39 into a cutting station equipped with a blade 40. The individual roller blanks 41 cut off there are clamped in jaws 42 on a turntable 44 rotating about its axis in the direction of the arrow 43 and pass with the turntable 44 into a wire shortening station 45 similar to that of stage III in FIG. 5B. During shortening in the station 45, a new blank 41 is taken up in jaws 42 offset, for example, through 90° while the previously finished roller 2 is introduced at an ejection station 46 likewise offset through 90° C., for example, into an automatic bundling and packaging machine 19 (cf., FIG. 4).

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In a process for the preparation of a hair curler comprising an axially elongated, low-density, elastic, foamed plastic body having a length suitable for a hair curler, and two opposed ends, with a substantially axially extending wire insert therein whose length is shorter than that of said plastic body, by continuously delivering low-density polyethylene granulate containing appropriate additives to an extruder and melting to a plastic mass, continuously supplying the mass melted in said extruder with blowing gas from a gas holder via metering pumps to form a continuous foam plastic melt, continuously cooling said foam plastic melt in a following cooling zone, continuously delivering a resulting cooled melt to a crosshead, continuously delivering a continuous wire to said crosshead, continuously forming a continuous strand of elastic foamed cooled low-density polyethylene having a density of less than about 100 kg/m$^3$ around said continuous wire whereby said continuous wire is continuously embedded in the core of said continuous strand of foamed low-density polyethylene, the improvement comprising:

(a) cutting the continuous strand of foamed low-density polyethylene and wire into a piece with a predetermined length suitable for a hair curler, having two ends with the wire therein between the ends, and (b) subsequently forming the embedded wire into an effective length which is shorter than said predetermined length so that each effective end of said wire is embedded within said cut piece a distance from each proximal end of said cut piece by pushing back the ends of the piece towards each other then forming each end of the embedded wire into a rounded loop or rounded head, and then causing the piece to spring back.

2. The process of claim 1, wherein the grip and thickness of the outer surface of the plastic body are regulated by the choice of the temperature gradient between a hot foam melt that forms the plastic body and an extrusion die through which the melt is extruded.

3. The process of claim 1, wherein the density of the foam immediately surrounding the wire insert is regulated by the choice of the temperature gradient between the wire and a hot foam melt that forms the plastic body.

4. The process of claim 1 wherein the outer surface of the plastic body is sealed relative to the porous foamed interior of the body.

5. The process of claim 1, wherein the outer surface of the plastic body is marked by a forming or embossing means to produce a corrugation or ribbing.

6. The process of claim 1, wherein the outer surface of the plastic body is ribbed by longitudinal milling.

7. The process of claim 1 wherein the density is about 50 kg/m³ or less.

8. The process of claim 1 comprising affording said continuous wire means on its surface sufficient to prevent longitudinal shifting of the wire insert relative to the plastic body.

9. The process of claim 8, wherein said surface means comprise a hot-galvanized coating.

10. The process of claim 8, wherein said surface means comprise a separate plastic coating.

11. The process of claim 1, wherein the wire insert consists of a deformable, non-resilient material.

12. The process of claim 1, wherein the wire insert comprises two or more individual wires.

13. The process of claim 1, wherein the outer skin of ends of the individual hair curlers containing said shortened wire insert is compressed and sealed.

14. The process of claim 16 wherein the compression and sealing of said outer ends is effected by means of heating.

15. The process of claim 1 wherein the ends of said wire insert are shortened by compressing said elongated foamed-plastic body to expose the wire insert, cutting the exposed ends of the wire insert and allowing the compressed elongated foam plastic body to expand to its original length.

16. The process of claim 1 wherein the forming of said wire into an effective length shorter than said predetermined length is by bending each end of said wire embedded within said piece.

17. In a process for the preparation of a hair curler comprising an axially elongated, low-density elastic, foamed plastic body having a length suitable for a hair curler, and two opposed ends, with a substantially axially extending wire insert therein whose length is shorter than that of said plastic body, by continuously delivering low-density polyethylene granulate containing appropriate additives to an extruder and melting to a plastic mass, continuously supplying the mass melted in said extruder with blowing gas from a gas holder via metering pumps to form a continuous foam plastic melt, continuously cooling said foam plastic melt in a following cooling zone, continuously delivering a resulting cooled melt to a crosshead, continuously delivering a continuous wire to said crosshead, continuously forming a continuous strand of elastic foamed cooled low-density polyethylene having a density of less than about 100 kg/m³ around said continuous wire whereby said continuous strand of foamed low-density polyethylene, the improvement comprising:
(a) cutting the continuous strand of foamed low-density polyethylene and wire into a piece with a predetermined length suitable for a hair curler, having two ends with the wire therein between the ends and
(b) subsequently forming the embedded wire into an effective length which is shorter than said predetermined length so that each effective end of said wire is embedded within said cut piece a distance from each proximal end of said cut piece by pushing back the ends of the piece towards each other, then shortening the wire embedded within, and then causing the piece to spring back.

18. The process of claim 17 wherein the forming of said wire into an effective length shorter than said predetermined length is by cutting off each end of said wire embedded within said piece.

19. A process for manufacturing a hair curler having an elongated elastic foamed plastic body with a substantially axially extending wire embedded therein, wherein the embedded wire is axially shorter than the plastic body and distanced from both ends thereof, comprising:
(A) gas extruding a continuous low density polyethylene foamed plastic body as a strand around substantially axially extending continuous wire, and
(B) forming a completed hair curler by:
(1) cutting the strand at a point preselected as an end for a hair curler body, without cutting the embedded wire, and clamping the wire exposed through the cut foamed plastic body;
(2) severing the wire at about an equal length from each side of the point at which it is clamped, by punching through the surrounding foamed plastic body and wire;
(3) axially displacing the cut strand while still clamping the wire, and axially displacing the clamped wire in a direction opposite to the direction in which the cut strand was displaced, thereby removing a cut length of clamped wire from one end of the displaced cut strand and also from a facing end of the remaining strand; and
(4) iteratively repeating steps (1) to (3) thereby successively forming said hair curlers.

20. A process for manufacturing a hair curler having an elongated elastic foamed plastic body with a substantially axially extending wire embedded therein, wherein the embedded wire is axially shorter than the plastic body and distanced from both ends thereof, comprising:
(A) gas extruding a continuous low density polyethylene foamed plastic body as a strand around a substantially axially extending continuous wire, and
(B) forming a completed hair curler by:
(1) cutting said strand and wire at a preselected point from one end thereof defining a length of a hair curler body;
(2) clamping the cut strand and embedded wire;
(3) inwardly axially displacing both ends of the cut strand sufficiently to expose a length of wire at each of its ends;
(4) cutting off segments of each exposed length of wire about equal to a desired distance from an end of the wire to a proximal end of the hair curler foamed plastic body; and
(5) causing the displaced ends of the elastic strand to revert to their formed shape.

21. A process for manufacturing a hair curler having an elongated elastic foamed plastic body with a foamed plastic body with a substantially axially extending wire embedded therein, wherein the embedded wire is axially shorter than the plastic body and distanced from both ends thereof, comprising:
(A) gas extruding a continuous low density polyethylene foamed plastic body as a strand around a substantially axially extending continuous wire, and
(B) forming a completed hair curler by:

(1) cutting the end of the strand and embedded wire to a desired hair curler length;
(2) clamping the cut strand and embedded wire;
(3) inwardly axially displacing both ends of the cut strand sufficiently to expose a length of wire at each of its ends,
(4) forming each end of the embedded wire into an inward folded loop or rounded head at each end of exposed embedded wire, so that each said loop or rounded head of the wire terminates at a desired distance from a proximal end of the hair curler plastic body; and
(5) causing the displaced ends of the elastic strand to revert to their formed shape.

22. A process for manufacturing a hair curler having an elongated elastic foamed plastic body with a substantially axially extending wire embedded therein, wherein the embedded wire is axially shorter than the plastic body and distanced from both ends thereof, comprising:
(A) gas extruding a continuous low density polyethylene foamed plastic body as a strand around a substantially axially extending continuous wire, and
(B) forming a completed hair curler by:
(1) cutting, at a point preselected to be at a junction of juxtaposed ends of two hair curlers being formed, respectively, said strand with two pairs of opposed cutting blades without cutting the wire embedded therein;
(2) separating axially each pair of opposed blades while still engaged in cutting positions proximate said wire, thereby axially-displacing the formed strand ends in opposite directions along said wire, thereby exposing a segment of embedded wire equal in length to twice the desired distance between an end of the embedded wire and the proximal ends of the associated hair curlers, respectively, being formed;
(3) cutting the length of the exposed segment simultaneously via said separated pairs of opposed blades; and
(4) repeating steps (1) and (3) thereby completing the formation of one hair curler.

* * * * *